(12) United States Patent
Nanda et al.

(10) Patent No.: US 11,347,799 B2
(45) Date of Patent: May 31, 2022

(54) SPACE ACCOUNTING FOR DATA STORAGE USAGE

(71) Applicant: EMC IP Holding Company LLC, Hopkinton, MA (US)

(72) Inventors: Kumari Bijayalaxmi Nanda, Edison, NJ (US); Michal Marko, Fanwood, NJ (US); Nushafreen Dara Palsetia, Mumbai (IN); Joris Johannes Wils, Framingham, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 492 days.

(21) Appl. No.: 16/530,433

(22) Filed: Aug. 2, 2019

(65) Prior Publication Data

US 2021/0034675 A1 Feb. 4, 2021

(51) Int. Cl.
*G06F 16/90* (2019.01)
*G06F 16/901* (2019.01)
*G06F 3/06* (2006.01)

(52) U.S. Cl.
CPC .......... *G06F 16/9027* (2019.01); *G06F 3/064* (2013.01); *G06F 3/0604* (2013.01); *G06F 3/0683* (2013.01); *G06F 16/9014* (2019.01)

(58) Field of Classification Search
CPC . G06F 16/9027; G06F 16/9014; G06F 3/0604
See application file for complete search history.

(56) References Cited

U.S. PATENT DOCUMENTS

| | | | |
|---|---|---|---|
| 2007/0294506 A1 | 12/2007 | Ross | |
| 2011/0202744 A1 | 8/2011 | Kulkarni et al. | |
| 2012/0166448 A1 | 6/2012 | Li et al. | |
| 2015/0269279 A1* | 9/2015 | Bosshart | G06F 16/2255 707/798 |
| 2017/0163575 A1* | 6/2017 | Wang | H04L 49/9094 |
| 2017/0249218 A1 | 8/2017 | Falkinder et al. | |

(Continued)

OTHER PUBLICATIONS

Notice of Allowance dated Mar. 31, 2021 for U.S. Appl. No. 16/530,072; 10 Pages.

(Continued)

*Primary Examiner* — Loc Tran
(74) *Attorney, Agent, or Firm* — Daly, Crowley Mofford & Durkee, LLP (57) ABSTRACT

An aspect of space accounting includes providing a counter for each of a plurality of key/value pairs for storage system operations. The key uniquely identifies a logical storage unit on which operations associated with the key are performed, the value identifies an amount of data usage with respect to the operations performed on the logical storage unit, and the counter tracks a type of the operations. An aspect also includes tracking, via corresponding counters, updates to a read/write (RW) tablet associated with a Cuckoo tree. The tracking includes updating a filter to include instances of key/value pairs and the RW tablet in which the pairs are stored. An aspect further includes tracking a plurality of read-only (RO) tablets associated with the Cuckoo tree. The tracking includes updating the filter to include instances of key/value pairs and one or more of the RO tablets in which the pairs are stored.

14 Claims, 7 Drawing Sheets

(56) References Cited

U.S. PATENT DOCUMENTS

2018/0203917 A1    7/2018  Marshall et al.

OTHER PUBLICATIONS

U.S. Appl. No. 16/530,072, filed Aug. 2, 2019, Palsetia et al.
U.S. Appl. No. 16/177,240, filed Oct. 31, 2018, Wils.
Xiaozhou Li et al., Algorithmic Improvements for Fast Concurrent Cuckoo Hashing, http://www.cs.princeton.edu/~mfreed/docs/cuckoo-eurosys14, 38 pages.

* cited by examiner

FIG. 7

SPACE ACCOUNTING FOR DATA STORAGE USAGE

BACKGROUND

In large-scale storage systems there can be millions of volumes or families of volumes that have random and varying identification and lifespans. The number and identifiers (IDs) of the volumes/families may change over time and are not predictable. It is preferable that volume IDs are never reused.

Each volume or family incurs operations that require associated counters to increase or decrease. The rate of the updates can be very high (e.g., as high as one increment or decrement per page of user data received). The counters need to survive reboots and power outages so must be stored on persistent media, typically solid state devices (SSDs). However, it is not feasible to store the counters on a simple array, tree or hash structure. If such data structures are used on SSD, then a typical counter update would require an update to an SSD page which is far larger than the counter itself. Thus, there would be a major negative performance impact and increase in SSD wear. In fact, in use cases where the volume traffic is done in SSD page increments, the counter update would halve the throughput of the system and double its wear unless specialized high cost hardware is used. Additionally, in today's highly multi-core systems, the above simple structures would suffer from contention.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method space accounting for data storage usage is provided. The method includes providing a counter for each of a plurality of key/value pairs corresponding to metadata for operations performed at a storage system. The key uniquely identifies a logical storage unit on which operations associated with the key are performed, and the value identifies an amount of data usage with respect to the operations performed on the logical storage unit and the counter tracking a type of the operations. The method also includes tracking, via corresponding counters, updates to a read/write (RW) tablet associated with a Cuckoo tree. The tracking includes updating a filter to include instances of key/value pairs and the RW tablet in which the pairs are stored. The method also includes tracking a plurality of read-only (RO) tablets associated with the Cuckoo tree. The tracking includes updating the filter to include instances of key/value type pairs and one or more of the RO tablets in which the pairs are stored.

Another aspect may provide a system for space accounting of data storage usage. The system includes a memory having computer-executable instructions. The system also includes a processor operated by a storage system. The processor executes the computer-executable instructions. When executed by the processor, the computer-executable instructions cause the processor to perform operations. The operations include providing a counter for each of a plurality of key/value pairs corresponding to metadata for operations performed at a storage system. The key uniquely identifies a logical storage unit on which operations associated with the key are performed, and the value identifies an amount of data usage with respect to the operations performed on the logical storage unit and the counter tracking a type of the operations. The operations also include tracking, via corresponding counters, updates to a read/write (RW) tablet associated with a Cuckoo tree. The tracking includes updating a filter to include instances of key/value pairs and the RW tablet in which the pairs are stored. The operations also include tracking a plurality of read-only (RO) tablets associated with the Cuckoo tree. The tracking includes updating the filter to include instances of key/value pairs and one or more of the RO tablets in which the pairs are stored.

Another aspect may provide a computer program product for space accounting of data storage usage. The computer program product is embodied on a non-transitory computer readable medium. The computer program product includes instructions that, when executed by a computer at a storage system, causes the computer to perform operations. The operations include providing a counter for each of a plurality of key/value pairs corresponding to metadata for operations performed at a storage system. The key uniquely identifies a logical storage unit on which operations associated with the key are performed, and the value identifies an amount of data usage with respect to the operations performed on the logical storage unit and a type of the operations. The operations also include tracking, via corresponding counters, updates to a read/write (RW) tablet associated with a Cuckoo tree. The tracking includes updating a filter to include instances of key/value type pairs and the RW tablet in which the pairs are stored. The operations also include tracking a plurality of read-only (RO) tablets associated with the Cuckoo tree. The tracking includes updating the filter to include instances of key/value-operation type pairs and one or more of the RO tablets in which the pairs are stored.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION

Embodiments are directed to space accounting for data storage usage that employs a Cuckoo tree including counters for gathering and tracking updates to operations, which are maintained as key/value pairs in a reverse order, sorted chain of tablets. The tablets are searchable, require very little memory, and minimize lock contention issues. The Cuckoo tree (which is also referred to as a key value engine (KVE) also utilizes a filter, which indicates with high probability which tablet(s) contains a given key.

In embodiments, the space accounting processes described herein enable a storage system to account for storage space usage based on varying criteria with respect to operations performed on storage units. For example, the system may lease storage space (e.g., virtual disk space) to clients and uses the tracking information to ascertain data usage (e.g., in data block increments) for its billing system. There are several aspects that can have an impact on the total amount of storage used, e.g., how much of the data is compressed (blocks with many zeros are highly compressible and therefore take up less storage than an image), deduplicated (e.g., how much data is stored as raw data and how much is stored as references to pre-existing raw data). This storage usage types can be tracked through the use of relative and absolute counters. By way of example, suppose the tracking is for storage usage for a virtual volume. Key value pairs (where the keys represent the virtual volume written to and the value represents change in storage space usage) are entered into a database. The Cuckoo tree enables searching on the database, as well as consolidation of the relative counters stored in tablets over time into a consolidated tablet, which contains absolute counters.

Figure 1:
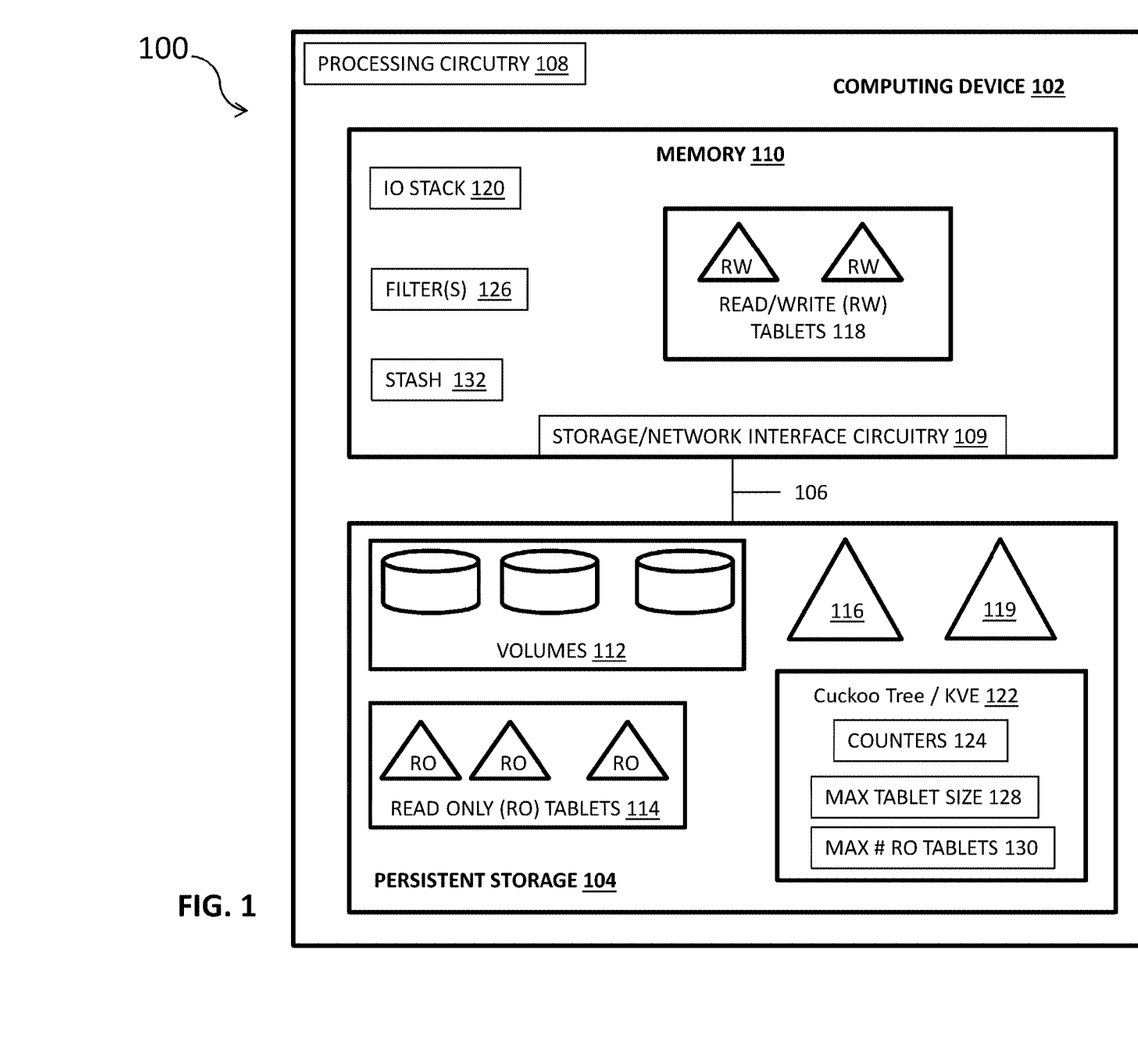
FIG. 1 is a block diagram depicting an example system for use in connection with various embodiments.

Turning now to FIG. 1, a storage system 100 for space accounting of data storage usage will now be described in accordance with embodiments. The system 100 includes a computing device 102 connected to persistent data storage 104 via connection 106. In some embodiments, the persistent data storage 104 may be locally installed within the same chassis as computing device 102, while in other embodiments, the persistent data storage 104 may be external to or remote from computing device 102.

Computing device 102 may be any kind of computing device, such as, for example, a personal computer, workstation, server computer, enterprise server, data storage system (DSS) rack server, laptop computer, tablet computers, smart phone, mobile computer, etc. Typically, computing device 102 is a DSS rack server. Computing device 102 includes processing circuitry 108, storage interface and/or network interface circuitry 109, and memory 110. Computing device 102 may also include other components as are well-known in the art, including interconnection circuitry.

Processing circuitry 108 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Storage interface and/or network interface circuitry 109 provides access and an interface to connection 106 to persistent data storage 104 and may control persistent data storage 104. Connection 106 may be any kind of connection over which computing device 102 can communicate with persistent data storage 104 such as, for example, Ethernet cables, Wireless Fidelity (Wi-Fi) wireless connections, an IP network, SCSI cables, SATA cables, Fibre Channel (FC) cables, etc. If connection 106 is a network connection, then storage interface and/or network interface circuitry 109 may include, for example, one or more Ethernet cards, cellular modems, FC adapters, Wi-Fi wireless networking adapters, and/or other devices for connecting to a network. If connection 106 is a local storage connection, then storage interface and/or network interface circuitry 109 may include for example, SCSI, SAS, ATA, SATA, FC, and/or other similar controllers and ports.

Persistent data storage 104 may include any kind of persistent storage devices, such as, for example, hard disk drives, solid-state storage devices, flash drives, etc. Persistent data storage 104 stores user data as volumes 112, which represents one or more logical disks accessible by users. Volumes 112 are organized and managed with reference to metadata that is stored within various data structures, including a set of read only (RO) tablets 114, one or two larger consolidated tablets 116 and 119, all of which are stored on persistent storage 104, as well as within a read/write (RW) table 118 stored within memory 40. Tablets 114, 116, 118, and 119 may be any kind of sorted data structures configured to provide fast access to key-value pairs, such as, for example, B-trees, B+ trees, B*-trees, binary trees, etc. In an embodiment, the tablets form part of a Cuckoo Tree. The tablets are described further herein.

When a merge operation is performed on the RO tablets, the contents of the RO tablets and consolidated tablet 116 are consolidated into consolidated tablet 119. When the consolidation has consolidated all the keys, then consolidated tablet 116 is discarded. Consolidated tablet 116 takes its place. As a result, the new consolidated tablet 116 has the consolidated values of all the Upserts in the RO tablets of this and all previous merges.

Memory 110 may be any kind of digital system memory, such as, for example, random access memory (RAM). Memory 110 stores an operating system (OS, not depicted) in operation (e.g., a Linux, UNIX, Windows, MacOS, or similar operating system). Memory 110 also stores an input/output (I/O) stack 120 in operation. I/O stack 120 allows I/O requests (not depicted) from external hosts (as well as local applications) to be processed with respect to the volume data 112 managed by the computing device 102.

The memory 110 of computing device 102 stores a filter 126. The filter 126 refers to a data structure that is configured to determine with a high probability which tablet contains a given key. The filter 126 may be a Bloom filter or a Cuckoo filter and is described further herein. The memory 110 also stores a stash 132. The stash 132 is a simple table that stores entries for keys. The filter 126 and the stash 132 are described further herein.

The persistent storage 104 also stores a Cuckoo tree 122, which may be implemented in logic executable by the processing circuitry. The Cuckoo tree 122 gathers updates to operations, with respect to their corresponding metadata, via the counters 124, which in turn track the updates made to entries in the tables. The Cuckoo tree 132 is configured to enable searches of the counter updates via the tablets.

The Cuckoo tree 122 operates to enforce a maximum tablet size 128 before a new tablet will be created, and a maximum number of RO tablets 130 that may be maintained by the system before a merge operation is performed. These parameters may be user-tunable parameters or may be system-defined or default parameters.

The tablets and stash (Cuckoo Tree) may be implemented using the Cuckoo Tree structures described in U.S. patent application Ser. No. 16/530,072, entitled "Cuckoo Tree With Duplicate Key Support," filed on Aug. 2, 2019, the entire contents of which are incorporated herein by reference in their entirety. The Cuckoo Tree described therein includes two features. One feature provides that the same key can exist numerous times in a database (e.g., as many times as there are tablets). If the buckets/tablets overflow, then the stash (e.g., consisting of {key, tablet-set} is used. The second feature provides the tablet set as a reverse order chain of {tablet-identifiers} with the most current values at the head of the list.

Figure 2:
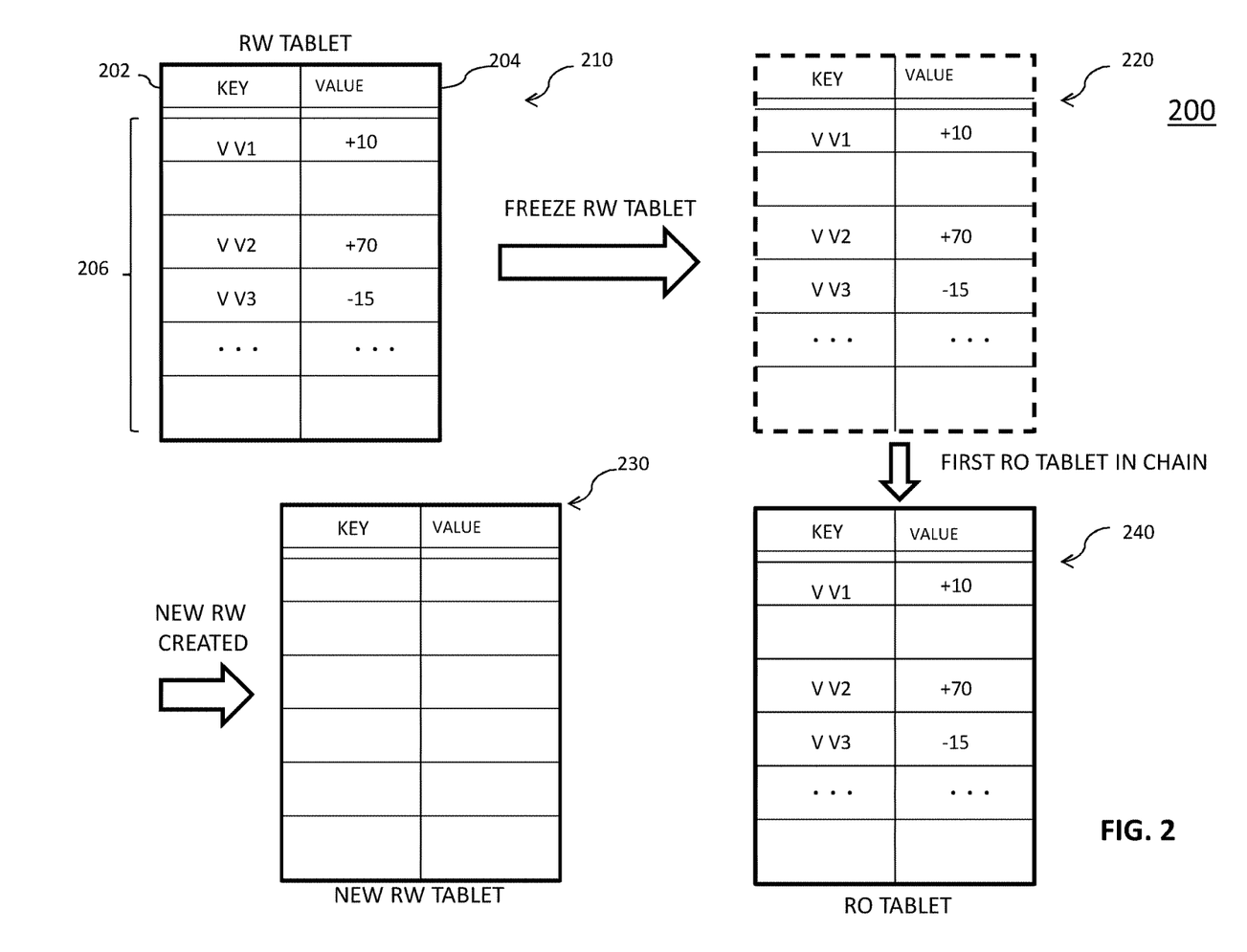
FIG. 2 is a block diagram depicting an example of read/write (RW) and read-only (RO) tablets in connection with various embodiments.

FIG. 2 is a diagram 200 illustrating a set of tablets for a Cuckoo tree and describes a process that is implemented when the limit set for the maximum number of keys in a RW tablet is reached. The tablets 210 and 230 in FIG. 2 correspond to the tablets 118 in FIG. 1. The tablet 240 in FIG. 2 corresponds to one of the tablets 114 in FIG. 1. As shown in FIG. 2, a RW tablet 210 stores entries 206 for keys 202 and associated values 204. For example, an entry is recorded for an update with respect to a virtual volume (VV1) and the value of the update is +10 increase in storage usage. An entry is recorded for a decrease in storage of −70 by virtual volume (VV3). A counter is maintained for each virtual volume that recorded activity in that tablet.

The Cuckoo tree 122 monitors the entries in the RW tablet 210. When the number of entries reaches a limit (e.g., 128 keys or time expiration), the RW tablet 210 is frozen (tablet 220), which means it is not permitted to accept any additional entries, and a new RW tablet 230 is created. The frozen tablet 220 is set as read only and is placed first in the chain of RO tablets (tablet 240). The new RW tablet 230 can accept new key value pairs. The new RW tablet 230 and the RO tablet 240 form part of the modified chain of tablets for a Cuckoo Tree.

As the number of RO tablets accumulate, the ability to efficiently search the tablets is impeded, as the volume of data can slow down processing of the system. The system provides for a maximum number of RO tablets that can be maintained in the chain (e.g., 25 tablets). When this limit has been reached, the system performs a merge operation on the RO tablets and a possibly existing consolidated tablet 116, consolidating their contents into the consolidated tablet 119 of FIG. 1. The merge operation is done with an internally generated query of the ROs. When the merge operation has completed consolidated tablet 116 is discarded and 119 takes its place.

Figure 3:
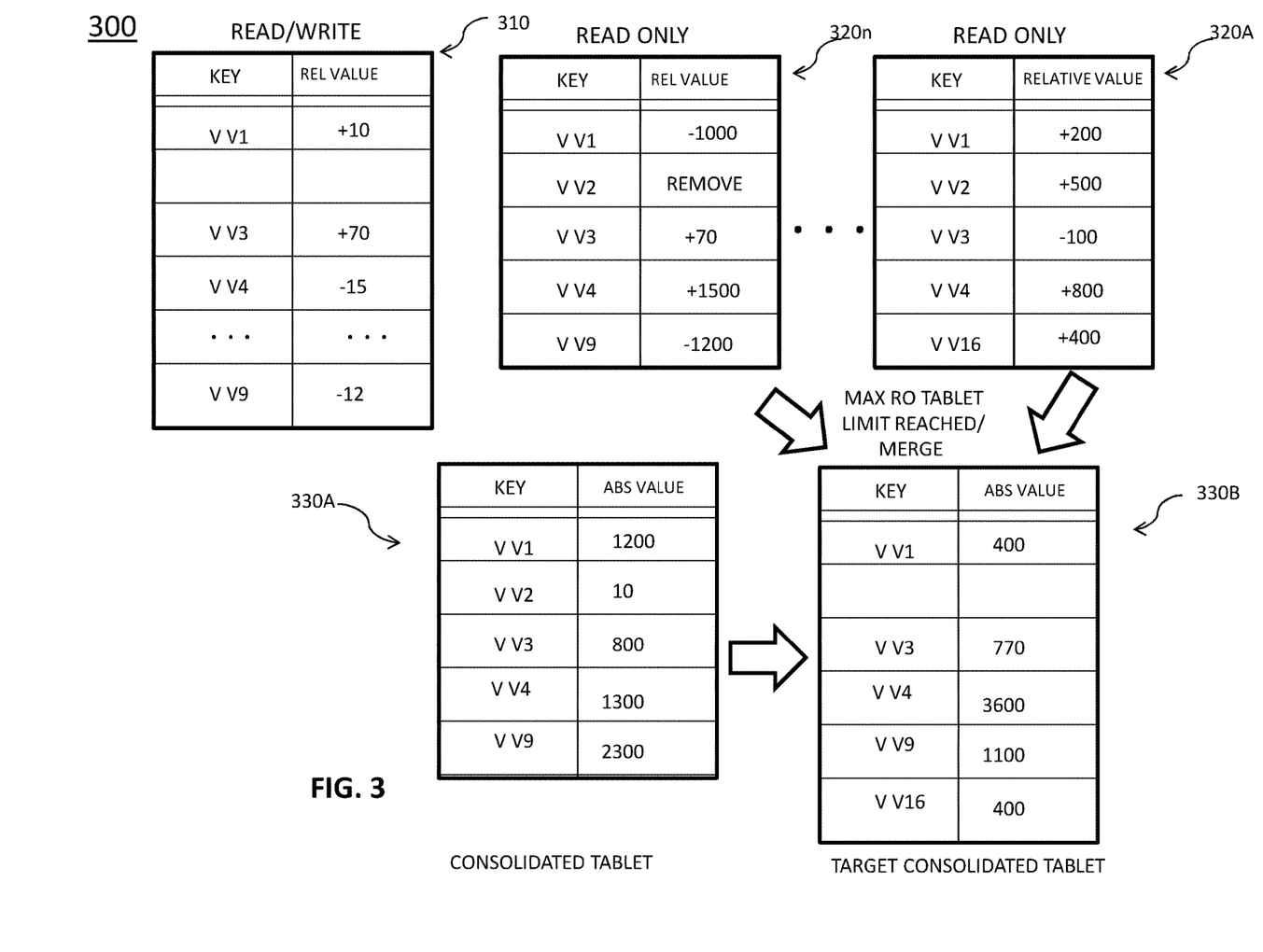
FIG. 3 is a block diagram depicting an example of RW, RO, and a consolidated tablet in connection with various embodiments.

FIG. 3 is a diagram 300 illustrating a reverse-order chain of tablets for a Cuckoo tree and a process that is implemented when the limit set for the maximum number of RO tablets in the chain is reached. The diagram 300 depicts a RW tablet 310, read only (RO) tablets 320A-320n (in reverse order of creation), and a consolidated tablet 330. The RW tablet 310 corresponds to the RW tablet 118 in FIG. 1, the RO tablets 320A-320n correspond to the RO tablets 114 of FIG. 1, and the consolidated target tablet 330 corresponds to the consolidated tablet 116 of FIG. 1. Once the limit of RO tablets has been reached (e.g., tablet 320n is the limit), a merge operation is performed on the tablets 320A-320n. The merge operation searches the tablets 320A-320n and consolidates values having the same key. Thus, the consolidated tablet 330 shows the total values for each of the keys of 320A-302n (assuming for this simplified example there are no intermediate RO tablets between them). As shown in FIG. 3, in RO tablet 320n, VV1 indicates a reduction in space usage by −1000 and in RO tablet 302A, VV1 reflects 200 storage usage increase. In RO tablet 320n, VV2 indicates removal, which means the VV2 was removed. After the merge operation, in the consolidated tablet 330B, VV1 has storage usage of 400, the sum of the values in tablets 330A, 320A and 320n. Similarly, VV2 is been left out of 330B since it was removed.

Figure 4:
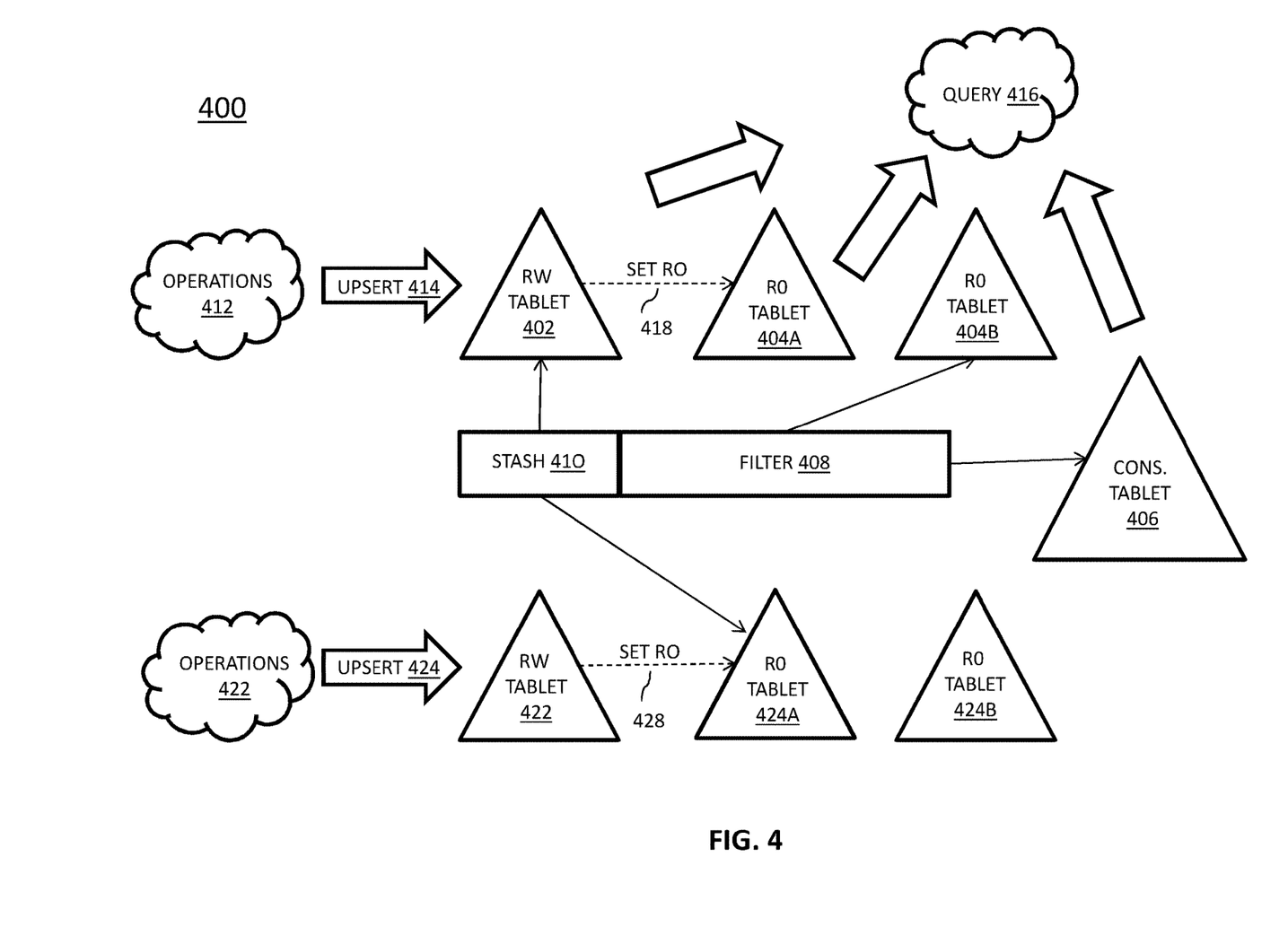
FIG. 4 is a block diagram depicting a Cuckoo tree and operations performed thereon in connection with various embodiments.

Turning now to FIG. 4, a diagram 400 of two chains of tablets are illustrated as performing operations in parallel. The operations (e.g., 412/422) performed on the chains include adding entries to tablets, consolidating tablets, and querying tablets. A typical counter update entry is referred to as an Upsert (e.g., 414/424), which can be made to a corresponding RW tablet (e.g., 402/422, respectively). This is an entry that increments or decrements a counter by one or more. If the Upsert matches an existing Upsert in the RW tablet, then the contents of the existing Upsert in the RW tablet are updated to reflect the consolidated value. Thus, an a +1 Upsert that matches an existing +1 Upsert changes the existing +1 Upsert to a +2 Upsert. Or an a +1 Upsert that matches an existing −2 Upsert changes the existing −2 Upset to an −1 Upsert. If the new Upsert cancels out the existing Upsert (e.g., a +1 and a −1), then the existing Upsert can be removed or may be changed to an a +0 Upsert.

However, if a new Upsert (e.g., 414) does not exist in the RW tablet (e.g., tablet 402) but rather exists in another tablet (e.g., one of RO tablets 404A, 404B), then the insert operation will not find the existing Upsert. The insert operation will place a new Upsert into the active tablet (e.g., RW tablet 402). A filter 408 (which corresponds to the filter 126 in FIG. 1) indicates that both tablets (e.g., the RW tablet and the RO tablet(s) in which the key is present) contain an Upsert for that key. The filter tracks and stores a list of all keys and tablets in which the keys are present. At some point in time, a query (e.g., 416) can be made to search both tablets for the Upsert contents. It can add the values returned to get the sum of the Upserts.

Tablet queries must search all rows of tablets typically as shown in FIG. 4, a query 416 can search one or more of the tablets 402, 404A-404B, 422, 424A-424B, and 406 for a key. In embodiments, the Cuckoo tree 122 checks the filter 408 for the key to determine which tablets contain the key. The query 416 is then performed only on those tablets. Since the tablets are sorted, the disk and memory cost to search a single tablet is very low.

Remove or Absolute entries can exist. Remove entries will force the key to be disregarded in all further queries and to be left out of the Target Consolidated Tablet at the next merge. An Absolute entry in a tablet will force the consolidated value for its key to an absolute value during a query or a merge. The entries in the Consolidated Tablet and in RO tablets that were frozen before this tablet will be disregarded. Instead, the sum of the absolute value plus those in RW tablets and newer RO tablets will be consolidated. In this way keys can be forcibly removed or reused.

A query for the latest (i.e., most recent) value of a key can be obtained by inspecting the filter to determine which tablets contain the key. Then each tablet is read, and the values are consolidated. Since most tablets are frozen the query creates little disruption to the update path.

Higher layers such as a user interface, meant for reporting storage consumption to the data storage system administrator, require consistent sets of counters on a periodic basis (e.g., once per minute). Such queries typically collect of a range of keys. To provide consistent counters, the embodiments periodically set all the read-write tablets to read-only. This does not disrupt the update processes because new read-write tablets are created immediately before the change over from one set of read-write tablets to another set.

The higher layer query may only inspect the contents of the read-only tablets. Since these tablets are read-only, the higher layer query is efficient and it does not disrupt the update processes with locks. The higher layer query for the range of keys is efficient because the tablets contain in-order keys. The counters in the query are consistent since all the tablets were frozen at the same time.

The consolidated tablet 406 (which corresponds to tablet 119 in FIG. 1) continuously contains the absolute values of the consolidated tablets because it is the accumulation of all deltas over time. This accumulation enables high efficiency of the database (the adds continuously enter the RW tablets which are in memory and therefore are fast, which means they are not slowing down operations). The goal of high speed updates to the database are met (all clients are consolidated in the consolidated tablet but each client has its own key). To perform a query to identify how much storage space usage of a client has changed since the last merge, the consolidated tablet is not searched. Thus, the embodiments enable the query to search the existing RO tablets prior to any merge operation, as well as the RW tablet, and the results can be consolidated to provide a near real-time usage value. If merge operations are performed once per hour, the ability to search more recent tablets can provide usage change information, e.g., 100 GB was used in the last ten minutes. Once the merge operations have completed, the consolidated tablet and the consolidated RO tablets may be discarded to make room for new tablets.

Two rows of tablets are shown in FIG. 4. The system may employ a plurality of rows of tablets because, e.g., if two operations 412 and 422 are doing an Upsert (414 and 424, respectively) to the same tablet at the same time, it can create a performance bottleneck because databases are difficult to update simultaneously. If both Upserts were operating on the same tablets it may cause some database integrity performance bottlenecks (e.g., if both are changing the same part of the database, it will wait for the other complete). If each Upsert has its own tablet (e.g., RW tablets 402 and 422, respectively) and RO tablets (e.g., 404A/404B and 424A and 424B, respectively) then each can update its own tablet and bump its counter without interference by other operations. There can be several Upserts operating in parallel (e.g., 64 Upserts). Even if the keys are the same both operations can update at the same time.

The number of tablets can accumulate to a large number. If a client or key is rarely used then it could be that only a few tablets are updated. Upon receiving a query, it would be expensive to visit every one of the tablets to see if the key is in them. The stash/filter combination 410/408 takes the key and performs a hash on the key so it contains a small number of bits, and the hashed key is stored in a location with a hash function. Suppose a key belongs to a client in which few updates are performed. Upon receiving a query for the key, the system looks in the filter to see if the key is in there. The hashed key may apply to multiple keys since it is only a few bits in length, so a hit on the query may correspond to a different key. However, the probability that it is for a different key is low. If there is a hit, the system knows that the client did an update and the filter will provide which tablets have the updates for that key. Thus, the query will need to search only those tablets. The stash, which is an extension to the filter, allows the filter to support very large numbers of duplicates. For example, some keys are used so frequently that they may be present in every tablet. As the filter may only support a small number of duplicate keys, the stash is used to alleviate this problem.

Figure 5:
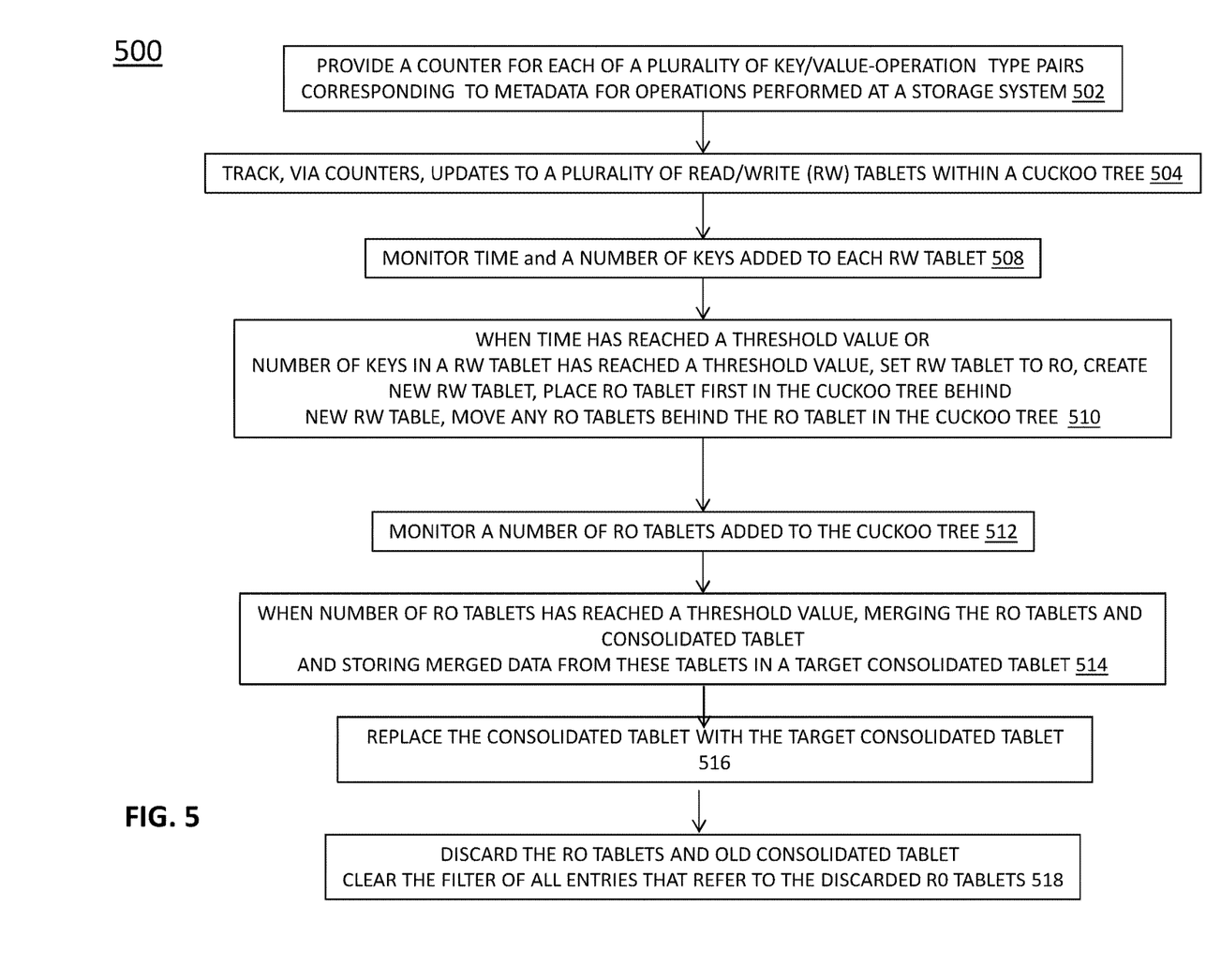
FIG. 5 is a flow diagram of a process for use in connection with various embodiments.

Turning now to FIG. 5 a flow diagram of a process 500 for space accounting of storage system usage will now be described. In block 502, the process provides a counter for each of a plurality of key/value-operation type pairs corresponding to metadata for operations performed at a storage system. The key uniquely identifies a logical storage unit on which operations associated with the key are performed. The value-operation identifies an amount of data usage with respect to the operations performed on the logical storage unit, and a type of the operations.

In block 504, the process 500 tracks, via corresponding counters, updates to a plurality of read/write (RW) tablets within a Cuckoo tree. The tracking includes updating a filter to include instances of key/value-operation type pairs and the RW tablet in which the pairs are stored.

In block 508, the process 500 monitors a number of keys added to each RW tablet and, in block 510, upon determining the number of the keys has reached a threshold value, the process 500 sets the RW tablet to RO, creates a new RW tablet, places the RO tablet first in the Cuckoo tree behind the new RW tablet, and moves any RO tablets in existence prior to setting the RW tablet to RO, behind the RO tablet in the Cuckoo tree.

In block 512, the process 500 monitors a number of RO tablets added to the Cuckoo tree. Upon determining the number of keys has reached a threshold value in block 514, the process 500 merges the RO tablets, and stores merged data from the tablets in a target consolidated tablet. Searching the filter for a key includes searching the consolidated tablet for the key.

In block 516, Replace the discarded consolidated tablet with the target consolidated tablet. In block 518, discard the RO tablets used in the merge process 500. Discard the consolidated tablet. Discard all references to the discarded RO tablets from the Filter.

Figure 6:
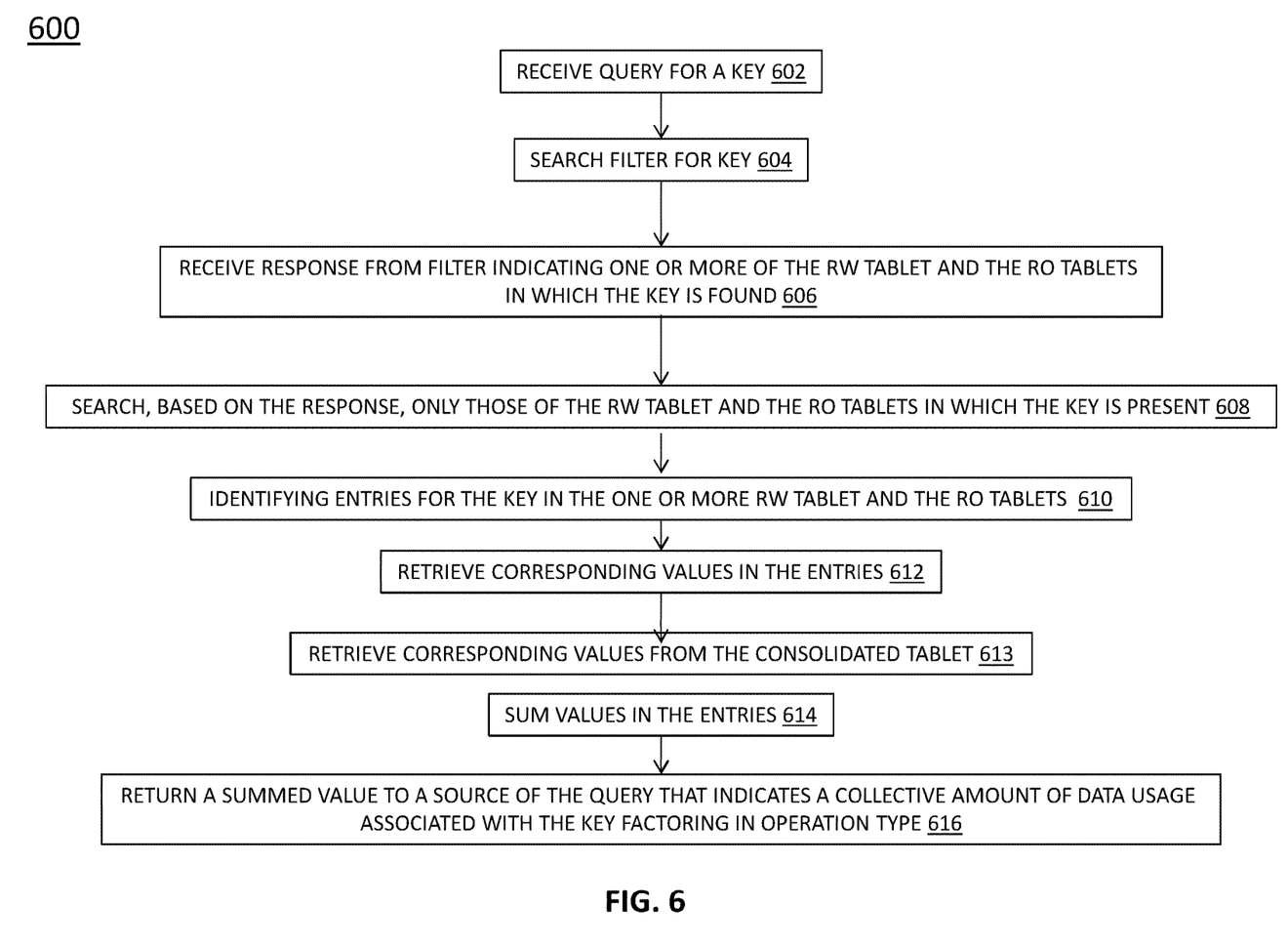
FIG. 6 is a flow diagram of another process for use in connection with various embodiments.

Turning now to FIG. 6, a flow diagram illustrating a process 600 for searching a Cuckoo tree for a given key will now be described in accordance with an embodiment.

In block 602, the process 600 receives a query for a key. In block 604, the process 600 searches the filter for the key. In block 606, at least one response is received from the filter indicating one or more of the RW tablet and the RO tablets in which the key is found.

In block 608, the process 600 searches, based on the response, only those of the one or more of the RW tablet and the RO tablets in which the key is present. Upon identifying entries for the key in the one or more of the RW tablet and the RO tablets in block 610, the process 600 retrieves corresponding values in the entries in block 612. There are no references in the filter to keys in the Consolidated Tablet as it usually has an entry for each key, so process 600 always attempts to retrieve a counter from the Consolidated Tablet. Process 600 sums the values in the entries in block 614, and returns a summed value to a source of the query in block 616. The summed value indicates a collective amount of data usage associated with the key factoring in the operation type.

Figure 7:
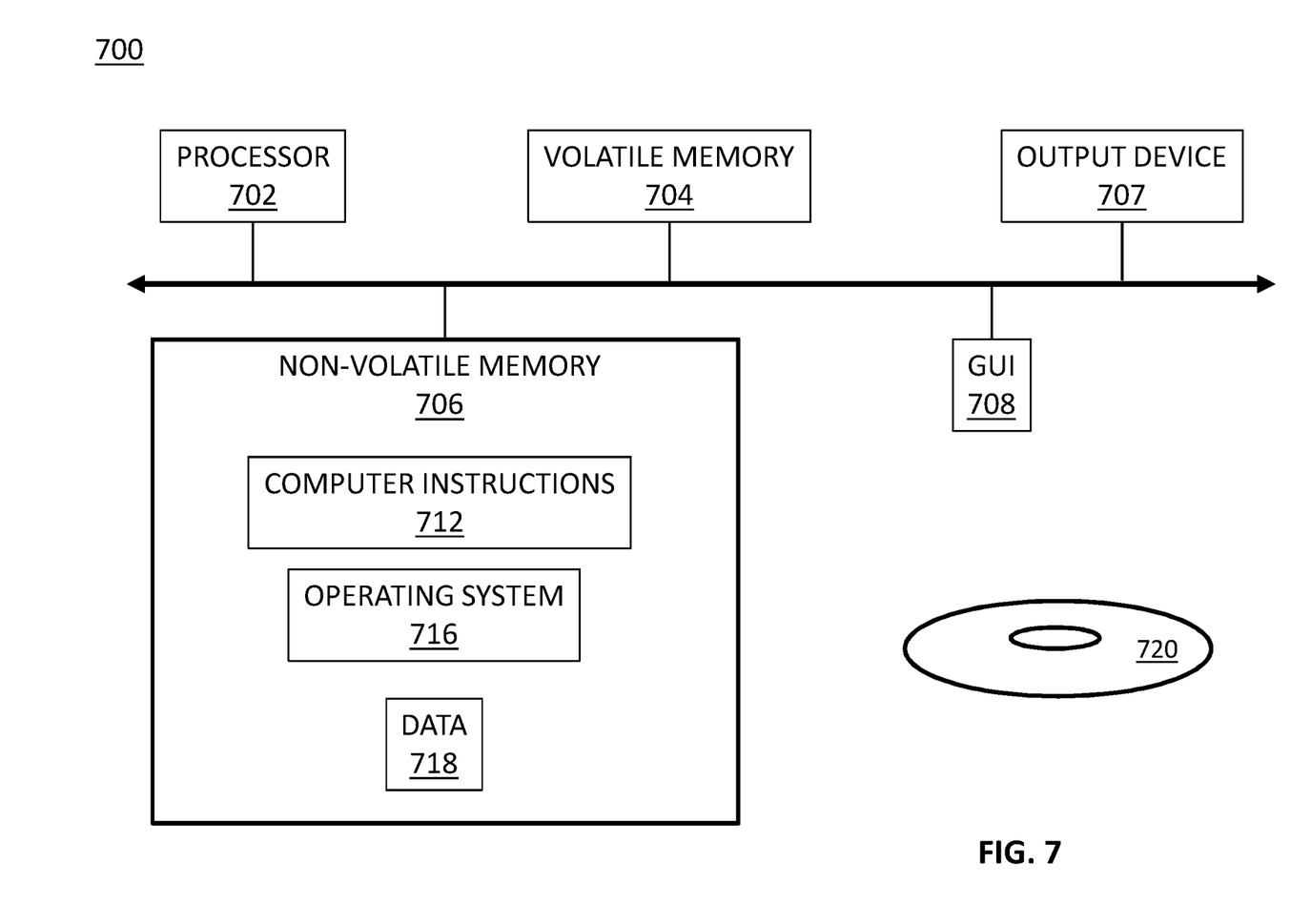
FIG. 7 is a diagram depicting an example system for use in connection with various embodiments.

FIG. 7 shows an exemplary computer 700 (e.g., physical or virtual) that can perform at least part of the processing described herein. The computer 700 includes a processor 702, a volatile memory 704, a non-volatile memory 706 (e.g., hard disk or flash), an output device 707 and a graphical user interface (GUI) 708 (e.g., a mouse, a keyboard, a display, for example). The non-volatile memory 706 stores computer instructions 712, an operating system 716 and data 718. In one example, the computer instructions 712 are executed by the processor 702 out of volatile memory 704. In one embodiment, an article 720 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to the disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method of space accounting for data storage usage, the method comprising:
providing a counter for each of a plurality of key/value-operation type pairs corresponding to metadata for operations performed at a storage system, the key uniquely identifying a logical storage unit on which operations associated with the key are performed, the value-operation identifying an amount of data usage with respect to the operations performed on the logical storage unit, and a type of the operations;
tracking, via corresponding counters, updates to a plurality of read/write (RW) tablets within a Cuckoo tree, the tracking including updating a filter to include instances of key/value-operation type pairs and the RW tablets in which the pairs are stored;
tracking updates to a plurality of read-only (RO) tablets in the Cuckoo tree, the tracking including updating the filter to include instances of key/value-operation type pairs and one or more of the RO tablets in which the pairs are stored;
monitoring a number of keys added to each RW tablet of the plurality of RW tablets, and upon determining the number of added keys to a RW tablet of the plurality of RW tablets has reached a threshold value: converting the RW tablet to an RO tablet, creating a new RW tablet, and adding the new RW tablet to the Cuckoo tree;
monitoring a number of RO tablets that are present in the Cuckoo tree, and upon determining the number of RO tablets has reached a threshold count: merging the number of RO tablets and storing merged data from the number of RO tablets into a consolidated tablet; and
upon receiving a query for a key, searching the consolidated tablet for the key.

2. The method of claim 1, wherein the RO tablet is positioned ahead of the plurality of RO tablets in the Cuckoo tree.

3. The method of claim 1, further comprising:
monitoring a number of merge operations performed on the RO tablets over time, the merge operations producing a plurality of consolidated tablets; and
upon determining a threshold value has been reached for the merge operations, merging the plurality of consolidated tablets into a single, consolidated tablet.

4. The method of claim 1, wherein the operation type is one of compression and non-compression, wherein factoring in the operation type includes factoring in compressed data resulting from a corresponding operation in the amount of data usage.

5. The method of claim 1, wherein the operation type is one of an allocated write and an overwrite, wherein factoring in the operation type includes factoring in how much of the data usage correlates to allocated writes and how much of the data usage correlates to overwrites in determining a collective amount of data usage.

6. The method of claim 1, further comprising:
providing a hash data structure for the Cuckoo tree, the hash data structure including a hash function performed on each of the keys, wherein hashed keys are stored in the hash data structure;
wherein searching the filter for the key includes searching the hash data structure for the key prior to searching the filter.

7. A system for implementing space accounting for data storage usage, the system includes:
a memory comprising computer-executable instructions; and
a processor executing the computer-executable instructions, the computer-executable instructions when executed by the processor cause the processor to perform operations comprising:
providing a counter for each of a plurality of key/value-operation type pairs corresponding to metadata for operations performed at a storage system, the key uniquely identifying a logical storage unit on which operations associated with the key are performed, the value-operation identifying an amount of data usage with respect to the operations performed on the logical storage unit, and a type of the operations;
tracking, via corresponding counters, updates to a read/write (RW) tablet within a Cuckoo tree, the tracking including updating a filter to include instances of key/value-operation type pairs and the RW tablet in which the pairs are stored;

tracking updates to a plurality of read-only (RO) tablets in the Cuckoo tree, the tracking including updating the filter to include instances of key/value-operation type pairs and one or more of the RO tablets in which the pairs are stored;

monitoring a number of keys added to each RW tablet of the plurality of RW tablets, and upon determining the number of added keys to a RW tablet of the plurality of RW tablets has reached a threshold value: converting the RW tablet to an RO tablet, creating a new RW tablet, and adding the new RW tablet to the Cuckoo tree;

monitoring a number of RO tablets that are present in the Cuckoo tree, and upon determining the number of RO tablets has reached a threshold count: merging the number of RO tablets and storing merged data from the number of RO tablets into a consolidated tablet; and upon receiving a query for a key, searching the consolidated tablet for the key.

8. The system of claim 7, wherein the RO tablet is positioned ahead of the plurality of RO tablets in the Cuckoo tree.

9. The system of claim 7, wherein the operations further comprise:

monitoring a number of merge operations performed on the RO tablets over time, the merge operations producing a plurality of consolidated tablets; and upon determining a threshold value has been reached for the merge operations, merging the plurality of consolidated tablets into a single, consolidated tablet.

10. The system of claim 7, wherein the operation type is one of compression and non-compression, wherein factoring in the operation type includes factoring in compressed data resulting from a corresponding operation in the amount of data usage.

11. The system of claim 7, wherein the operation type is one of an allocated write and an overwrite, wherein factoring in the operation type includes factoring in how much of the data usage correlates to allocated writes and how much of the data usage correlates to overwrites in determining a collective amount of data usage.

12. The system of claim 7, wherein the operations further comprise:

providing a hash data structure for the Cuckoo tree, the hash data structure including a hash function performed on each of the keys, wherein hashed keys are stored in the hash data structure;

wherein searching the filter for the key includes searching the hash data structure for the key prior to searching the filter.

13. A computer program product for implementing space accounting for data storage usage, the computer program product embodied on a non-transitory computer readable medium, the computer program product including instructions that, when executed by a computer, causes the computer to perform operations comprising:

providing a counter for each of a plurality of key/value-operation type pairs corresponding to metadata for operations performed at a storage system, the key uniquely identifying a logical storage unit on which operations associated with the key are performed, the value-operation identifying an amount of data usage with respect to the operations performed on the logical storage unit, and a type of the operations;

tracking, via corresponding counters, updates to a read/write (RW) tablet within a Cuckoo tree, the tracking including updating a filter to include instances of key/value-operation type pairs and the RW tablet in which the pairs are stored;

tracking updates to a plurality of read-only (RO) tablets in the Cuckoo tree, the tracking including updating the filter to include instances of key/value-operation type pairs and one or more of the RO tablets in which the pairs are stored;

monitoring a number of keys added to each RW tablet of the plurality of RW tablets, and upon determining the number of added keys to a RW tablet of the plurality of RW tablets has reached a threshold value: converting the RW tablet to an RO tablet, creating a new RW tablet, and adding the new RW tablet to the Cuckoo tree;

monitoring a number of RO tablets that are present in the Cuckoo tree, and upon determining the number of RO tablets has reached a threshold count: merging the number of RO tablets and storing merged data from the number of RO tablets into a consolidated tablet; and upon receiving a query for a key, searching the consolidated tablet for the key.

14. The computer program product of claim 13, wherein the operations further comprise:

upon receiving a query for a key:

searching the filter for the key;

receiving at least one response from the filter indicating one or more of the RW tablet and the RO tablets in which the key is found;

searching, based on the at least one response, only those of the one or more of the RW tablets and the RO tablets in which the key is present; and upon identifying entries for the key in the one or more of the RW tablets and the RO tablets, retrieving corresponding values in the entries, summing values in the entries, and returning a summed value to a source of the query, the summed value indicating a collective amount of data usage associated with the key factoring in the operation type.

\* \* \* \* \*